United States Patent
Poncelet et al.

(10) Patent No.: US 11,965,075 B2
(45) Date of Patent: Apr. 23, 2024

(54) PROCESS FOR TREATING A MATERIAL CHOSEN FROM AMONG A POLYAMIDE, A POLYESTER AND A POLY(METH)ACRYLATE

(71) Applicants: Schneider Electric Industries SAS, Rueil-Malmaison (FR); Commissariat A L'Energie Atomique Et Aux Energies Alternatives, Paris (FR)

(72) Inventors: Olivier Poncelet, Grenoble (FR); Daniel Getto, Grenoble (FR); Olivier Renard, Grenoble (FR); Mehrdad Hassanzadeh, Clapiers (FR); Romain Maladen, Sinard (FR); Karim Helal, Grenoble (FR)

(73) Assignees: Commissariat à l'énergie atomique et aux énergies alternatives, Paris (FR); Schneider Electric Industries SAS, Rueil Malmaison (FR)

( * ) Notice: Subject to any disclaimer, the term of this patent is extended or adjusted under 35 U.S.C. 154(b) by 575 days.

(21) Appl. No.: 17/125,187

(22) Filed: Dec. 17, 2020

(65) Prior Publication Data
US 2021/0189079 A1    Jun. 24, 2021

(30) Foreign Application Priority Data
Dec. 20, 2019 (FR) ........................... 1915262

(51) Int. Cl.
| | | |
|---|---|---|
| *B29C 71/00* | (2006.01) | |
| *C08J 7/02* | (2006.01) | |
| *C08K 3/36* | (2006.01) | |
| *C08K 7/10* | (2006.01) | |

(52) U.S. Cl.
CPC ............. *C08J 7/02* (2013.01); *B29C 71/0009* (2013.01); *C08K 3/36* (2013.01); *C08K 7/10* (2013.01); *B29C 2071/0054* (2013.01)

(58) Field of Classification Search
CPC .................... B29C 71/0009; B29C 2071/0054
See application file for complete search history.

(56) References Cited

U.S. PATENT DOCUMENTS

| | | | |
|---|---|---|---|
| 5,508,060 A | 4/1996 | Perman et al. | |
| 6,517,752 B1* | 2/2003 | Hiraishi | B05D 3/002 264/28 |
| 2005/0240004 A1 | 10/2005 | Yusa et al. | |
| 2010/0200274 A1* | 8/2010 | Jonsson | B29C 70/58 174/137 B |
| 2018/0327593 A1* | 11/2018 | Kasahara | H05K 3/46 |
| 2018/0345576 A1 | 12/2018 | Constantinou et al. | |

FOREIGN PATENT DOCUMENTS

FR        3068700 A1    1/2019

OTHER PUBLICATIONS

National Institute of Industrial Property (France) Search Report for Application No. 1915262 dated Sep. 21, 2020, 1 page.

* cited by examiner

*Primary Examiner* — Arrie L Reuther
*Assistant Examiner* — Alexander A Wang
(74) *Attorney, Agent, or Firm* — Locke Lord LLP

(57) ABSTRACT

This invention relates to a treatment process for a material chosen from among a polyamide, a polyester and a poly (meth)acrylate. According to the invention, this process comprises a step in which contact is made between this material and a polar organic solvent in a supercritical fluid. This invention also relates to a process for manufacturing a part from a material chosen from among a polyamide, a polyester and a poly(meth)acrylate in a divided form. Finally, the invention relates to use of the material treated by the treatment process and to use of the part manufactured by the manufacturing process in the low voltage, medium voltage or high voltage electrical industry.

40 Claims, No Drawings

PROCESS FOR TREATING A MATERIAL CHOSEN FROM AMONG A POLYAMIDE, A POLYESTER AND A POLY(METH)ACRYLATE

TECHNICAL FIELD

This invention relates to a new process for treating a material of a component of an electrical appliance to impart improved moisture resistance properties to the material thus treated.

This invention also relates to a process for manufacturing a part of such a component and to uses of the treated material and of the manufactured part in the low, medium or high voltage electrical industry.

STATE OF PRIOR ART

In the electrical industry field, electrically insulating component(s) of electrical appliances are conventionally made of a polymer material. In particular, this material can be a composite material, i.e. be composed of a material comprising a polymer matrix and fillers, or stiffeners, which may be in the form of particles or fibers.

As examples, components of these electrical appliances are formed from a composite material based on polyamide and that comprises silica fillers, specifically glass fibers. These glass fibers are typically present with proportions by mass equal to between 30% m and 50% m relative to the total mass of the composite material.

Use of a polymeric material in components of electrical appliances is becoming increasingly frequent. However, it is necessary to make sure that the particularly high performance dielectric and/or mechanical properties of these components, which are subject to high stress throughout their service life and whose properties may be degraded if there is any water intake into the material.

To limit the water intake of a composite material based on polyamide and comprising silica fillers, document WO 2018/078114, reference [1] in the following, discloses a process for treatment of this composite material by impregnation of this material with at least one hydrophobic additive in supercritical carbon dioxide $CO_2$. Such a hydrophobic additive is more particularly chosen from among dielectric silicone oils and hydrophobic fluorinated compounds, these oils and compounds being soluble in supercritical $CO_2$.

Although the process described in document [1] is quite satisfactory in the sense that the treated composite material is characterised by a water intake of less than or equal to 1% after immersion in water at 90° C. for 3 weeks, the Inventors fixed themselves the objective of finding an alternative treatment process for obtaining a material that; after exposure to a warm and moist environment for a period of almost 6 weeks, is characterised by small water intake values, typically less than or equal to 3%, and very good electrical and/or mechanical properties.

PRESENTATION OF THE INVENTION

This and other objectives are thus achieved firstly by a process for treating a material of a component of an electrical appliance, the material being chosen from among a polyamide, a polyester and a poly(meth)acrylate.

According to the invention, this process comprises a step (1) in which contact is made between this material and a polar organic solvent in a supercritical fluid denoted SC1.

The Inventors observed that, unexpectedly and surprisingly, bringing such a material into contact with a supercritical fluid in the presence of a polar organic solvent makes it possible to extract, in a particularly significant and practically definitive manner, the residual water contained in the material, and by so doing, to impart improved moisture resistance properties to this material.

Furthermore, it is particularly interesting to note that the treatment process according to the invention can be easily, quickly and economically implemented industrially.

Therefore the process according to the invention can not only reduce the water content but also reduce the water intake of a particular polymer material, the polymer forming the material being chosen from among a polyamide, a polyester and a poly(meth)acrylate. This material is advantageously a polyamide.

The polyester(s) are polymers that contain ester functions resulting from the polycondensation of carboxilic acid and diol functions of one or several monomers chosen from among polyols, anhydrides and carboxylic acids.

These polyesters can be aliphatic homopolyesters or copolyesters, semi-aromatic polyesters, or aromatic polyesters.

As examples of aliphatic homopolyesters, mention may be made of poly(glycolic acid) PGA, poly(lactic acid) PLA, polycaprolactone PCL, polyhydroxyalcanoate PHA and poly-β-hydroxybutyrate PHB.

As examples of aliphatic copolyesters, mention may be made of polyethylene adipate PEA and polybutylene succinate PBS.

As examples of semi-aromatic or aromatic polyesters, mention may be made of polyethylene terephthalate PET, polybutylene terephthalate PBT, polytrimethylene terephthalate PTT, polyethylene naphthalate PEN and polyarylate.

Poly(meth)acrylate(s) are polymers derived from (meth)acrylic acid, the expression "(meth)acrylic acid" covering both acrylic acid and methacrylic acid.

These poly(meth)acrylates may be salts or esters of poly(meth)acrylic acid.

As examples of poly(meth)acrylate salts, mention may be made of lithium poly(meth)acrylate and sodium poly(meth)acrylate.

As examples of polymethacrylate esters, mention may be made of polymethyl methacrylate PMMA, polyethyl methacrylate PEMA, polybutyl methacrylate PBMA and lauryl polymethacrylate.

The polyamide(s) are polymers that contain amide functions resulting from the polycondensation of carboxilic acid and amine functions of one or several monomers chosen from among lactams, carboxylic amino acids, dicarboxylic acids and diamines.

These polyamides may be aliphatic homopolymers or copolymers (denoted PA), semi-aromatic polyamides or polyphthalamides (denoted PPA), or aromatic polyamides or aramids (denoted PAA).

As examples of aliphatic homopolymers, mention may be made of PA 6, PA 4.6, PA 6.6, PA 6.9, PA 6.10, PA 6.12, PA 10.10 and PA 10.12.

As examples of aliphatic copolymers, mention may be made of PA 6/6, PA 6.6/6 and PA 6/6.6/6.10.

As examples of polyphthalamides, which are so-called "high performance" polyamides due to their excellent mechanical properties and resistance to high temperatures, mention may be made of PA 6.T, PA 9.T, PA 10.T, PA 6.1, PA 6/6.T, PA 6.6/6.T and PA MXD.6.

Advantageously, the polyamide(s) of the material treated by the process according to the invention are chosen from among PA 6, PA 6.6, PA 6.10, PA 6.12 and polyphthalamides.

Preferably, the polyamide(s) of the material treated by the process according to the invention are chosen from among PA 6.6 and PA 6.T.

In one variant of the process, the material treated by the process according to the invention may not include any filler.

The absence of any incorporated filler has the advantage that a transparent or translucent material is obtained, so that an operator can see the state of components located inside the electrical appliance through the material.

In another variant of the process, the material treated by the process according to the invention may be composite and may also comprise fillers.

The choice of incorporating fillers in the material has two advantages, on the one hand, to further limit the water intake of the polymer and, on the other hand, to maintains the high-performance dielectric and/or mechanical properties of components that are highly stressed throughout their service life.

Fillers may be organic or inorganic.

In particular, fillers may be chosen from among silica, polyester, aramid, boron nitride, antimony trioxide and alumina fillers and mixtures thereof.

These fillers may advantageously be silica fillers.

The fillers may be in the form of particles, fibers or in the form of mixtures thereof.

When the fillers, and particularly silica, are in the form of particles, the largest dimension of these particles may be between 0.1 µm and 100 µm and, advantageously, between 0.2 µm and 40 µm.

It is specified that the expression "between . . . and . . . " mentioned above and that is used in this application should be understood as meaning not only values within the interval but also the bounding values of this interval.

When the fillers are in the form of fibers, particularly silica also called glass fibers, they can have a diameter of between 5 µm and 100 µm and, advantageously, between 10 µm and 70 µm, their length being between 50 µm and 1000 µm and, advantageously, between 200 µm and 700 µm.

In one advantageous variant, the length/diameter ratio of the fibers, particularly silica fibers, is between 5 and 100 and preferably between 10 and 50.

In one variant of the process according to the invention, the proportion by mass of the fillers, and particularly silica, is greater than or equal to 20% m, advantageously between 25% m and 60% m and, preferably, between 30% m and 50% m, relative to the total mass of the composite material.

In this step (1) of the process according to the invention, the polymeric material is brought into contact with a polar organic solvent in a supercritical fluid SC1.

It is specified that "supercritical fluid" means a fluid that is used at temperature and pressure values that are higher than their respective critical temperature and pressure values.

The polar organic solvent that is used in the process according to the invention can equally well be protic or aprotic.

If this solvent is a protic polar organic solvent, it can advantageously be an alcohol. Preferably, the alcohol is methanol or ethanol.

If this solvent is an aprotic polar organic solvent, it may be chosen from among a ketone, for example acetone or butanone, an ether and a chloroalkane such as dichloromethane. Preferably, the ketone is acetone and the ether is tetrahydrofuran (THF).

In one variant of the process according to the invention, the supercritical fluid SC1 is chosen from among carbon dioxide, methane, propane, butane, dinitrogen and dimethyl ether.

In one advantageous variant, this supercritical fluid SC1 is carbon dioxide or butane.

In one variant of the process according to the invention, step (1) in which the material is brought into contact with the polar organic solvent in the supercritical fluid SC1 is carried out at a temperature of between 80° C. and 200° C. and at a pressure of supercritical fluid SC1 of between 100 bar and 400 bar.

In one advantageous variant, this temperature is between 90° C. and 180° C. and, preferably, between 100° C. and 170° C.

In one advantageous variant, the supercritical fluid SC1 pressure is between 120 bar and 375 bar and, preferably, between 150 bar and 350 bar.

As indicated above, step (1) of the process according to the invention is easy and quick to implement. In particular, the duration of this step (1) may be between 30 min and 4 h and, advantageously, between 1 h and 3 h.

The treatment process according to the invention may also comprise a complementary step (2) after this step (1) of bringing this material into contact with a polar organic solvent in a supercritical fluid SC1 that has just been described. This complementary step (2) consists of bringing the material as obtained at the end of step (1) into contact with one or several compounds comprising at least an isocyanate group, in a supercritical fluid SC2, this or these compounds being soluble in the supercritical fluid SC2, and each satisfying the following formula:

$$R\!-\!(N\!\!=\!\!C\!\!=\!\!O)_n \qquad (I)$$

wherein
n is equal to 1 or 2, and
R is chosen from among
a saturated or unsaturated, linear or branched, aliphatic hydrocarbon group comprising at least 2 carbon atoms, and
a saturated or unsaturated, possibly branched, cyclic aliphatic hydrocarbon group comprising at least 3 carbon atoms,
R possibly also comprising a free-radically polymerizable ethylenically unsaturated group such as a vinyl, allyl or (meth)acrylate group.

During this step (2), covalent links are formed by a reaction of the isocyanate group(s) of the compound of formula (I) with ester groups of the polyester(s), with (meth)acrylates groups of the poly(meth)acrylate(s) or with free amine and carboxylic acid groups of the polyamide(s) and, when silica fillers are present, with silica hydroxyl groups, thus leading to covalent grafting of the compound(s) of formula (I) within the material.

The combination of steps (1) and (2) thus makes it possible to obtain a material that has an optimized grafting ratio of the compound(s) of formula (1). Indeed, considering the very low residual water content present in the material as obtained at the end of step (1), the quantity of sub-products formed and, in particular, the quantity of urea originating from the reaction between the group(s) of the compound of formula (1) with water, is reduced.

The grafted material obtained at the end of step (2) is characterized not only by a very low water intake and by dielectric and/or mechanical properties comparable to those of the material as obtained at the end of step (1) alone, but also by complementary properties that are imparted to it by the nature of the R group of the grafted compound(s) (I).

According to a first variant, the R group is a saturated or unsaturated, linear or branched, aliphatic hydrocarbon group comprising at least 2 carbon atoms.

Thus, the R group according to this first variant can be formed by any alkyl, alkenyl or alkynyl group, with a linear or branched chain, which comprises at least 2 carbon atoms, advantageously between 4 and 30 carbon atoms and, preferably, between 6 and 20 carbon atoms.

As examples of compounds (I) according to this first variant, mention may be made of n-octadecyl isocyanate (of formula n-$C_{18}H_{37}$NCO) and 1,6-hexamethylene diisocyanate (HMDI, of formula OCN($C_6H_{12}$)NCO) that will be illustrated in examples D, 2.1 and 2.2 below.

According to a second variant, the R group is a saturated or unsaturated, possibly branched, cyclic aliphatic hydrocarbon group comprising at least 3 carbon atoms.

Thus, the R group according to this second variant can be formed by any cycloalkyl, cycloalkenyl or cycloalkynyl group, possibly branched, which comprises at least 3 carbon atoms, advantageously between 4 and 8 carbon atoms and, preferably, 6, carbon atoms.

As an example of a compound (I) according to this second variant, mention may be made of cyclohexyl isocyanate (of formula $C_7H_{11}$NCO) that will be illustrated in example 2.2 below.

Regardless of whether the first or second variant is considered, as long as the R group comprises at least 6 carbon atoms, the hydrophobic properties and consequently the low water intake of the grafted material by the compound(s) (I) are reinforced. Such properties are further reinforced when the aliphatic hydrocarbon group, whether cyclic or not, is entirely or partly fluorinated.

Also regardless of whether the first or second variant is considered, the R group of the compound(s) (I) may also comprise a free-radically polymerizable ethylenically unsaturated group such as a vinyl, allyl or (meth)acrylate group.

It is specified that the "(meth)acrylate group" and "(meth)acrylate monomer" expressions that will be seen later cover an acrylate group and an acrylate monomer as well as a methacrylate group and a methacrylate monomer, respectively.

As an example of a compound (I) according to the first variant further comprising a methacrylate group, mention may be made of 2-isocyanatoethyl (of formula ($C_6H_9O_2$)NCO) that will be illustrated in examples E and 3.1 below.

In one advantageous embodiment of the process according to the invention, during step (2), the material obtained at the end of step (1) is brought into contact with the compound(s) of formula (I) in the supercritical fluid SC2 in the presence of an aprotic polar organic solvent.

This aprotic polar organic solvent may be chosen from among the same compounds as those described above and consequently can advantageously be chosen from among a ketone, an ether and a chloroalkane. Preferably, the ketone is acetone and the ether is tetrahydrofuran.

In one variant of the process according to the invention, the supercritical fluid SC2 is chosen from among carbon dioxide, methane, propane, butane, dinitrogen and dimethyl ether.

In one advantageous variant, this supercritical fluid SC2 is carbon dioxide. In one variant of the process according to the invention, step (2) in which the material obtained at the end of step (1) is brought into contact with the polar organic solvent in the supercritical fluid SC2 is carried out at a temperature of between 60° C. and 200° C. and at a pressure of supercritical fluid SC2 of between 35 bar and 400 bar.

In one advantageous variant, this temperature is between 70° C. and 170° C. and, preferably, between 60° C. and 160° C.

In one advantageous variant, the supercritical fluid SC2 pressure is between 40 bar and 375 bar and, preferably, between 50 bar and 350 bar.

The duration of step (2) of the process according to invention may be between 30 min and 8 h and, advantageously, between 1 h and 4 h.

In the case in which the compound of formula (I) or one of the compounds of formula (I) comprises a free-radically polymerizable ethylenically unsaturated group, the process for treating a polymer material may also comprise a complementary step (3), after this step (2) of bringing the material obtained at the end of step (1) into contact, in a supercritical fluid SC2, with one or several compounds of formula (1), which has just been described.

This complementary step (3) consists of bringing, in a supercritical fluid SC3, the material as obtained at the end of step (2) into contact with a mixture comprising a radical polymerization initiator and one or several free-radically polymerizable ethylenically unsaturated monomers, the radical polymerization initiator and the monomer(s) each being soluble in the supercritical fluid SC3.

During this step (3), covalent links are formed by radical polymerization of ethylenically unsaturated groups originating from the compound(s) of formula (I) grafted on the material with the ethylenically unsaturated monomer(s) leading to a grafted and polymerized material still characterized by a very low water intake but also by better dielectric and/or mechanical properties than those of the material obtained at the end of step (1) alone.

In one variant of the process according to the invention, the free-radically polymerizable ethylenically unsaturated monomer(s) that are used in step (3) are chosen from among (meth)acrylate monomers.

As an example of (meth)acrylate monomers, mention may be made of ethyl methacrylate (of formula $C_6H_{10}O_2$) that will be illustrated in examples E and 3.1 below.

The radical polymerizable initiator may be chosen from among azobisisobutyronitrile (AIBN) and peroxides, for example tert-butyl hydroperoxide and dicumyl peroxide.

In one variant of the process according to the invention, the supercritical fluid SC3 is chosen from among carbon dioxide, methane, propane, butane, dinitrogen and dimethyl ether.

In one advantageous variant, this supercritical fluid SC3 is carbon dioxide. In a more particularly preferred variant, the supercritical fluids SC2 and SC3 are identical and are advantageously composed of carbon dioxide.

In one variant of the process according to the invention, step (3) is carried out at a temperature of between 50° C. and 100° C. and at a pressure of supercritical fluid SC3 of between 100 bar and 350 bar.

In one advantageous variant, this temperature is between 60° C. and 100° C. and, preferably, between 85° C. and 90° C.

In one advantageous variant, the supercritical fluid SC3 pressure is between 300 bar and 320 bar.

The duration of step (3) of the process according to the invention may be between 1 h and 5 h and, advantageously, between 1 and 4 h.

In a particularly preferred embodiment, the supercritical fluids SC1 and SC2, and possibly SC3, are identical and are advantageously composed of carbon dioxide.

In another particularly preferred embodiment, steps (1) and (2) and possibly step (3) are carried out in the same reactor.

These two embodiments that have just been described can reduce the number of manipulations and the treatment duration and, in so doing, can reduce the industrial costs related to the treatment process.

As will be seen below, the treatment process according to the invention, which includes step (1) only or which also includes step (2) and possibly step (3), can be used on a polymer material, regardless of whether this material is in divided form or is in the form of a part.

When this material is in the form of a part, this part may equally be a new part, in other words a part that has never been used, or a maintenance part that corresponds to a part that has already been used and for which it is required to improve the dielectric and/or mechanical and moisture resistance properties.

Therefore, it is observed that the process according to the invention is not limited to the treatment of a new part but it can be perfectly well transposed to the treatment of a part currently in use, so as to improve its dielectric and/or mechanical and moisture resistance properties, which represents a significant advantage in terms of increasing its lifespan.

When this material is in a divided form, it may particularly be in the form of pellets or platelets, and this divided form is intended to be further processed to form a finished part.

Thus, this invention secondly relates to a process for manufacturing a part of an electrical appliance from a material chosen from among a polyamide, a polyester and a poly(meth)acrylate, this material being in a divided form.

According to the invention, this process includes the following successive steps ($i_1$) and ($ii_1$):
- ($i_1$) treatment of the material in divided form by application of the process described above, and
- ($ii_1$) forming of the treated material in divided form as obtained at the end of step ($i_1$).

The process according to the invention can be used to manufacture a part provided with the excellent dielectric and/or mechanical and moisture resistance properties of the divided material from which this part is obtained.

In this manufacturing process, step ($i_1$) is carried out by the treatment process as defined above, it being specified that the advantageous and preferred characteristics of this treatment process, like those related to steps (1) and possibly (2) and (3), to the supercritical fluids SC1 and possibly SC2 and SC3, to the polar organic solvents, to the compound(s) of formula (I) and to the polyamide(s), polyester(s) and poly(meth)acrylate(s), can be taken alone or in combination.

In particular, step ($i_2$) in the manufacturing process can be carried out by using any technique for the transformation of polymer materials, and particularly by extrusion, by injection, etc.

Thirdly and fourthly, this invention relates to uses of the treated material and of the part manufactured by the treatment and manufacturing processes as defined above, the advantageous characteristics of these processes possibly being taken alone or in combination.

In particular, the treated material and the part manufactured by the processes according to the invention can be used in the electrical industry, namely in the low voltage, medium voltage or high voltage electrical industry.

Note that the expressions "low voltage", "medium voltage" and "high voltage" are used according to their conventional meanings, namely:
- the expression "low voltage" designates a voltage less than 1 kV in alternating current and less than 1.5 kV in direct current, and
- the expression "medium voltage" designates a voltage greater than or equal to 1 kV in alternating current and greater than or equal to 1.5 kV in direct current, but less than or equal to 52 kV in alternating current and less than or equal to 75 kV in direct current, and
- the expression "high voltage" designates a voltage greater than 52 kV in alternating current and greater than 75 kV in direct current.

In particular, the manufactured part may consist of any part of an operating mechanism of an electrical appliance, particular a switchgear, such as an insulating rod, a contactor, an embedded part (embedded pole or assembled pole), an insulator, a cross-piece and more generally any electrically insulating part participating in its operation.

The treated material and the manufactured part may also be used in, or consist of, one or several components of an electrical appliance such as a transformer, a line or a bulbar for the transmission or distribution of electricity, or a breaking device such as a switch, a circuit breaker or a combined fuse-switch or an isolating switch, for example an earthing isolator. More generally, an electrical appliance may be any equipment used to switch portions of a low, medium or high voltage electrical network on or off.

Component of the electrical appliance means an element of the electrical appliance, energized or not energized, located inside or outside the electrical appliance.

If used inside a breaking appliance, this breaking appliance may for example correspond to a sealed chamber in which there are also one or more electrical insulating components, electrical components and a gaseous medium electrically insulating and extinguishing electric arcs that could form inside this sealed chamber, the gaseous medium possible including air, a fluoronitrile, a fluoroketone, a hydrofluoroolefine or a mixture thereof.

Other characteristics and advantages of the invention will become clearer after reading the complementary description given below that relates to examples of the treatment of composite materials based on polyamide and comprising silica fillers and to the evaluation of mechanical and water intake properties of composite materials thus treated, some by a process according to the invention and others by "reference" processes.

DETAILED PRESENTATION OF PARTICULAR EMBODIMENTS

1. Operational Protocols of Experimental Tests

The samples are in the form of type A test pieces complying with standard ISO 3167 formed by a composite material composed of a PA 6.6 comprising 50% m of glass fibers and marketed by the Solvay Company under the tradename Technyl® A 218 V50 Natural.

Each treatment was carried out on a batch of 10 test pieces.

1.1. Process Only Including Step (1)

The batch of 10 test pieces in example A was not treated in any way and consequently corresponds to a reference example.

Each batch of examples B and C, which also correspond to reference examples, was placed in the internal volume of a reactor heated to temperature T1 and within which each batch was brought into contact, for a duration t1, with a supercritical fluid SC1 introduced and maintained, for the duration t1, at a pressure P1.

Each batch of examples 1.1 to 1.3, which correspond to three examples according to the invention, was placed with 10 ml of a polar organic solvent in the internal volume of a reactor heated to temperature T1. The assembly was brought into contact, for a duration t1, with a supercritical fluid SC1 introduced and maintained, for the duration t1, at a pressure P1.

The nature of the supercritical fluid SC1, the polar organic solvent if there is one, and the operational parameters T1, P1 and t1 are given in Table 1 below.

TABLE 1

| Examples | SC1 | Solvent | T1 (° C.) | P1 (bar) | T1 (h) |
|---|---|---|---|---|---|
| A | — | — | — | — | — |
| B | $CO_2$ | — | 160 | 300 | 1 |
| C | butane | — | 170 | 110 | 1 |
| 1.1 | $CO_2$ | ethanol | 160 | 300 | 3 |
| 1.2 | $CO_2$ | acetone | 160 | 300 | 3 |
| 1.3 | $CO_2$ | methanol | 160 | 300 | 3 |

1.2. Process Including Steps (1) and (2):

The batch of 10 samples in example D, which corresponds to a reference example, was placed in the internal volume of a reactor heated to temperature T1 and within which this batch was brought into contact, for a duration t1, with a supercritical fluid SC1 introduced and maintained, for the duration t1, at a pressure P1.

After the duration t1 and after decompression, a dropper bottle containing a mixture formed from:
- 1.06 g of n-octadecyl isocyanate (n-$C_{18}H_{37}$NCO),
- 1.01 g of 1.4-diazacyclo[2.2.2]octane (DABCO) as catalyst, and
- 2 ml of acetone, was introduced into the internal volume of the reactor that was then heated to a temperature T2 to bring the assembly into contact, for a duration t2, with a supercritical fluid SC2 introduced and maintained, for the duration t2, at a pressure P2.

Each batch of examples 2.1 and 2.2, which correspond to two examples conforming with the invention, was placed with a volume of:
- 5 ml of ethanol for example 2.1, and
- 10 ml of ethanol for example 2.2, in the internal volume of a reactor heated to a temperature T1 to bring the assembly into contact, for a duration t1, with a supercritical fluid SC1 introduced and maintained, for the duration t1, at a pressure P1.

After the duration t1 and after decompression, a dropper bottle containing:
- for example 2.1, a mixture formed from 1 g of n-octadecyl isocyanate (n-$C_{18}H_{37}$NCO) and 1 g of DABCO in 1 ml of acetone, and
- for example 2.2, a mixture formed from 1.6 g of cyclohexyl isocyanate ($C_7H_{11}$NCO) and 0.39 g of 1,6-hexamethylene diisocyanate (OCN($C_6H_{12}$)NCO) in 3 g of acetone, was introduced into the internal volume of the reactor that was then heated to a temperature T2 to bring the assembly into contact, for a duration t2, with a supercritical fluid SC2 introduced and maintained, for the duration t2, at a pressure P2.

The nature of the supercritical fluids SC1 and SC2, of the polar organic solvents, and the operational parameters T1, T2, P1, P2, t1 and t2 are given in Table 2 below.

TABLE 2

| | Examples | | |
|---|---|---|---|
| | D | 2.1 | 2.2 |
| Step (1): | | | |
| SC1/solvent | $CO_2$/— | $CO_2$/ethanol | butane/ethanol |
| T1 (° C.)/P1 (bar)/t1 (h) | 100/300/2 | 160/300/2 | 170/115/1 |
| Step (2): | | | |
| Compound (I) | n-$C_{18}H_{32}$NCO | n-$C_{18}H_{32}$NCO | $C_7H_{11}$NCO + OCN($C_6H_{12}$)NCO |
| SC2/Solvent | $CO_2$/acetone | $CO_2$/acetone | $CO_2$/acetone |
| T2 (° C.)/P2 (bar)/t2 (h) | 100/300/1 | 100/300/1 | 100/300/1 |

1.3. Process including steps (1) to (3):

The batch in example E, which corresponds to a reference example, was placed in the internal volume of a reactor heated to temperature T1 and within which this batch was brought into contact, for a duration t1, with a supercritical fluid SC1 introduced and maintained, for the duration t1, at a pressure P1.

After the duration t1 and after decompression, a dropper bottle containing:
- a mixture composed of 1.09 g of 2-isocyanatoethyl methacrylate (($C_6H_9O_2$)NCO) and 1 g of DABCO was placed in the internal volume of the reactor that was then heated to a temperature T2 to bring the assembly into contact, for a duration t2, with a supercritical fluid SC2 introduced and maintained, for the duration t2, at a pressure P2.

After the duration t2 and after decompression, a dropper bottle containing:
- 2 ml of ethyl methacrylate ($C_6H_{10}O_2$) and 1 g of azobisisobutyronitrile (AIBN)

was placed in the internal volume of the reactor that was then heated to a temperature T3 to bring the assembly into contact, for a duration t3, with a supercritical fluid SC3 introduced and maintained, for the duration t3, at a pressure P3.

The same operating protocol as that described above for the batch in example E was applied for the batch in example 3.1, except for step (1) that was performed by placing the batch of 10 test pieces with 15 ml of polar organic solvent in the internal volume of the reactor at a temperature T1 to bring the assembly into contact, for a duration t1, with a supercritical fluid SC1 introduced and maintained, for the duration t1, at a pressure P1.

The nature of the supercritical fluids SC1, SC2 and SC3, of the polar organic solvents, and the operational parameters T1, T2, T3, P1, P2, P3, t1, t2 and t3 are given in Table 3 below.

TABLE 3

| | Examples | |
|---|---|---|
| | E | 3.1 |
| Step (1): | | |
| SC1/solvent | $CO_2$/— | $CO_2$/ethanol |
| T1 (° C.)/P1 (bar)/t1 (h) | 160/300/2 | 160/300/2 |

TABLE 3-continued

| | Examples | |
|---|---|---|
| | E | 3.1 |
| Step (2): | | |
| Compound (I) | $(C_6H_9O_2)NCO$ | $(C_6H_9O_2)NCO$ |
| SC2/Solvent | $CO_2$/— | $CO_2$ |
| T2 (° C.)/P2 (bar)/t2 (h) | 100/300/1 | 100/300/1 |
| Step (3): | | |
| SC3/Monomer | $CO_2/C_6H_{12}O_2$ | $CO_2/C_6H_{12}O_2$ |
| T3 (° C.)/P3 (bar)/t3 (h) | 100/300/1 | 100/300/1 |

2. Evaluation of the Properties of the Treated Composite Materials 2.1. Evaluation of the Water Intake The "water intake" represents the quantity of water that can be absorbed by a material. It can be expressed by the ratio of the increase in the mass of the material after immersion in water, relative to its initial mass.

The evaluation of the water intake of a given material consists of placing a sample of material under given relative humidity conditions for a predefined duration. The material then hydrates, increasing the mass of the sample from an initial value m to a final value (m+δm). The water intake, expressed as a %, is therefore defined by the ratio δm/m.

In this case, each batch of test pieces treated in accordance with the protocols described above was weighed to determine the initial mass m.

Each batch was then placed in an atmosphere at 70° C. with saturated humidity (relative humidity equal to 100%) for 1000 h that is sufficiently long to saturate the tested test pieces. After 1000 h, each batch was weighed once again to determine the final mass m+δm.

The water intake results are summarised in Table 4 below.

2.2. Evaluation of Mechanical Properties

The mechanical properties were determined by tension tests performed at 23° C. on each batch of test pieces as obtained in paragraphs 1.1. and 1.2. above.

The values of the ultimate stress (in MPa) determined according to standard ISO 527-1:2012 are also given in Table 4 below.

TABLE 4

| Examples | Water intake (%) | Ultimate stress (MPa) |
|---|---|---|
| A | 3.9 | 143 |
| B | 3.7 | 141 |
| C | 3.4 | 151 |
| 1.1 | 2.1 | 150 |
| 1.2 | 2.3 | 152 |
| 1.3 | 2.1 | 150 |
| D | 3.3 | 139 |
| 2.1 | 2.2 | 153 |
| 2.2 | 2.7 | 150 |

The results in Table 4 clearly show the particularly beneficial effect of the treatment process according to the invention on water intake and the mechanical properties of a composite material based on a polyamide and comprising silica fillers.

In particular, with reference firstly to examples A and B, and secondly to examples 1.1 to 1.3, it is observed that water intake values of 3.9% obtained without any treatment (example A) and 3.7% obtained with a step (1) performed in supercritical $CO_2$ alone (example B) drop to values of between 2.1% and 2.3%, when step (1) is performed in supercritical $CO_2$ in the presence of a polar organic solvent such as ethanol, acetone or methanol (examples 1.1 to 1.3). Similarly, an improvement of mechanical properties is observed, the ultimate stress values of 143 MPa and 141 MPa in examples A and B changing to values between 150 MP and 152 MPa for examples 1.1 to 1.3 conforming with the invention.

This improvement is particularly significant if the reference values A and B are compared with example 2.1, which uses a treatment process comprising a step (1) performed in supercritical $CO_2$ in the presence of ethanol and a step (2) performed in supercritical $CO_2$ and in the presence of an isocyanate.

The comparison of water intake and ultimate stress values for examples 1.1 and 2.1 demonstrates that water intake values are maintained and that mechanical properties are improved with the implementation of a step (2) complementary to step (1).

The invention claimed is:

1. A process for the treatment of a material of a component of an electrical appliance to impart improved moisture resistance properties to the material, the material being chosen from among a polyamide, a polyester and a poly(meth)acrylate, the process comprising:
    a first step in which contact is made between the material and a polar organic solvent in a first supercritical fluid, and
    a second step of bringing the material as obtained at the end of the first step into contact in a second supercritical fluid with one or several compounds soluble in the second supercritical fluid and each satisfying the following formula (I):

$$R-(N=C=O)_n \qquad (I)$$

wherein
    n is equal to 1 or 2, and
    R is chosen from among
        a saturated or unsaturated, linear or branched, aliphatic hydrocarbon group comprising at least 2 carbon atoms, and
        a saturated or unsaturated, possibly branched, cyclic aliphatic hydrocarbon group comprising at least 3 carbon atoms.

2. A process according to claim 1, wherein the material is a composite material containing fillers.

3. A process according to claim 2, wherein the fillers are silica fillers.

4. A process according to claim 2, wherein the fillers are in the form of particles, fibers or in the form of mixtures thereof.

5. A process according to claim 2, wherein the proportion by mass of the fillers is greater than or equal to 20%.

6. A process according to claim 5, wherein the proportion by mass of the fillers is between 25% m and 60% m relative to the total mass of the composite material.

7. A process according to claim 1, wherein, during the first step, the polar organic solvent is a protic polar organic solvent.

8. A process according to claim 7, wherein the polar organic solvent is an alcohol.

9. A process according to claim 8, wherein the alcohol is methanol or ethanol.

10. A process according to claim 1, wherein the polar organic solvent, during the first step, is an aprotic polar organic solvent.

11. A process according to claim 10, wherein the polar organic solvent is chosen from among a ketone, an ether and a chloroalkane.

12. A process according to claim 11, wherein the ketone and the ether are acetone and tetrahydrofuran, respectively.

13. A process according to claim 1, wherein the first supercritical fluid is chosen from among carbon dioxide, methane, propane, butane, dinitrogen and dimethyl ether.

14. A process according to claim 1, wherein the first step is carried out at a temperature of between 80° C. and 200° C. and at a pressure of supercritical fluid of between 100 bar and 400 bar.

15. A process according to claim 1, wherein, during the second step, the material is brought into contact with the compound(s) of formula (I) in the second supercritical fluid in the presence of an aprotic polar organic solvent.

16. A process according to claim 15, wherein the aprotic polar organic solvent is chosen from among a ketone, an ether and a chloroalkane.

17. A process according to claim 16, wherein the ketone and the ether are acetone and tetrahydrofuran, respectively.

18. A process according to claim 1, wherein the second supercritical fluid is chosen from among carbon dioxide, methane, propane, butane, dinitrogen and dimethyl ether.

19. A process according to claim 1, wherein the second step is carried out at a temperature of between 60° C. and 200° C. and at a pressure of second supercritical fluid of between 35 bar and 400 bar.

20. A process according to claim 1, further comprising, after the second step and in the case in which one of the compounds of formula (I) comprises a free-radically polymerizable ethylenically unsaturated group, a third step consisting of bringing the material as obtained at the end of the second step into contact, in a third supercritical fluid, with a mixture comprising a radical polymerization initiator and one or several free-radically polymerizable ethylenically unsaturated monomers, the radical polymerization initiator and the monomer(s) each being soluble in the third supercritical fluid.

21. A process according to claim 20, wherein the free-radically polymerizable ethylenically unsaturated monomer (s) are chosen from among (meth)acrylate monomers.

22. A process according to claim 20, wherein the third supercritical fluid is chosen from among carbon dioxide, methane, propane, butane, dinitrogen and dimethyl ether.

23. A process according to claim 20, wherein the third step is carried out at a temperature of between 50° C. and 100° C. and at a pressure of third supercritical fluid of between 100 bar and 350 bar.

24. A process according to claim 20, wherein the first, second and third supercritical fluids are identical.

25. A process according to claim 24, wherein the first, second and third supercritical fluids are composed of carbon dioxide.

26. A process according to claim 20, wherein the first, second and third steps are carried out in the same reactor.

27. A process according to claim 1, wherein the first and second supercritical fluids are identical.

28. A process according to claim 27, wherein the first and second fluids are composed of carbon dioxide.

29. A process according to claim 1, wherein the first and second steps are carried out in the same reactor.

30. A process according to claim 1, wherein the polyamide(s) of the material are chosen from among PA 6, PA 6.6, PA 6.10, PA 6.12 and polyphthalamides.

31. A process according to claim 1, wherein the material is in a divided form or in the form of a part.

32. A process according to claim 31, wherein the part is a new part or a part in maintenance.

33. A process according to claim 1, wherein R comprises a free-radically polymerizable ethylenically unsaturated group.

34. A process according to claim 33, wherein the free-radically polymerizable ethylenically unsaturated group is a vinyl, allyl or (meth)acrylate group.

35. A process for manufacturing a part of an electrical appliance from a material chosen from among a polyamide, a polyester and a poly(meth)acrylate, this material being in a divided form, this process comprising the following successive steps (i) and (ii):
   (i) treatment of the material in divided form by application of the process according to claim 1, and
   (ii) forming of the treated material in divided form as obtained at the end of step (i).

36. A process according to claim 35, wherein the electrical appliance is a low, medium, or high voltage electrical appliance.

37. A process according to claim 1, wherein the electrical appliance is a low, medium or high voltage electrical appliance.

38. A process according to claim 37, wherein the electrical appliance comprises one or more electrically insulating components.

39. A process according to claim 38, wherein the electrical appliance is a breaking appliance that comprises a sealed chamber in which there are, in addition to the one or more electrical insulating components, electrical components and a gaseous medium electrically insulating and extinguishing electric arcs that could form inside this sealed chamber.

40. A process according to claim 39, wherein the gaseous medium includes air, a fluoronitrile, a fluoroketone, a hydrofluoroolefine or a mixture thereof.

* * * * *